US012653098B2

(12) United States Patent     (10) Patent No.:   US 12,653,098 B2

Hall et al.             (45) Date of Patent:     Jun. 16, 2026

(54) TURF MAINTENANCE MACHINE WITH DRIVE PULLEY HEIGHT ADJUSTMENT SYSTEM

(71) Applicant: Metalcraft of Mayville, Inc., Mayville, WI (US)

(72) Inventors: James Hall, Princeton, WI (US); Craig Antonioni, Lomira, WI (US)

(73) Assignee: Metalcraft of Mayville, Inc., Mayville, WI (US)

( * ) Notice: Subject to any disclaimer, the term of this patent is extended or adjusted under 35 U.S.C. 154(b) by 564 days.

(21) Appl. No.: 18/124,893

(22) Filed: Mar. 22, 2023

(65) Prior Publication Data

US 2023/0301233 A1     Sep. 28, 2023

Related U.S. Application Data

(60) Provisional application No. 63/322,801, filed on Mar. 23, 2022.

(51) Int. Cl.
| | |
|---|---|
| *A01D 34/74* | (2006.01) |
| *A01D 34/64* | (2006.01) |
| *A01D 101/00* | (2006.01) |

(52) U.S. Cl.
CPC ............. *A01D 34/74* (2013.01); *A01D 34/64* (2013.01); *A01D 2101/00* (2013.01)

(58) Field of Classification Search
CPC .... A01D 34/74; A01D 2101/00; A01D 34/64; A01D 34/83
USPC .......................................... 56/17.1, 11.6, 11.3
See application file for complete search history.

(56) References Cited

U.S. PATENT DOCUMENTS

| | | | | |
|---|---|---|---|---|
| 3,236,034 A | * | 2/1966 | Blettner | A01D 34/64 |
| | | | | D15/15 |
| 3,396,519 A | * | 8/1968 | Lehman | A01D 34/64 |
| | | | | 56/11.2 |
| 3,461,654 A | * | 8/1969 | Plamper | A01D 34/66 |
| | | | | 56/15.8 |
| 3,672,137 A | * | 6/1972 | Hamouz | A01D 34/64 |
| | | | | 56/15.8 |
| 3,696,594 A | * | 10/1972 | Freimuth | A01D 34/64 |
| | | | | 56/15.8 |
| 4,120,136 A | * | 10/1978 | Rose | A01D 34/64 |
| | | | | 56/15.8 |
| 4,914,898 A | | 4/1990 | Jenkins et al. | |

(Continued)

FOREIGN PATENT DOCUMENTS

| | | | | | |
|---|---|---|---|---|---|
| EP | 1101976 A2 | * | 5/2001 | .......... | F16H 7/1263 |
| EP | 3295784 A1 | * | 3/2018 | .......... | A01D 34/828 |
| GB | 2163711 A | * | 3/1986 | ............. | A01D 34/64 |

*Primary Examiner* — Joseph M Rocca
*Assistant Examiner* — Sunny D Webb

(57)        ABSTRACT

A turf maintenance machine, such as a lawnmower, implements a belt alignment system, such as a drive pulley height adjustment system, that automatically changes a height of a drive pulley as a function of height adjustments of the machine's workpiece. In the case of a lawnmower, the drive pulley height adjustment system may movably support the drive pulley from a chassis frame, independently of a moveable support relationship of a cutter deck from the chassis frame. A single actuator, such as a handle or an electric actuator, may be controlled to simultaneously translate component movement through two paths of actuation to move the cutter deck and the drive pulley.

17 Claims, 6 Drawing Sheets

(56)                References Cited

U.S. PATENT DOCUMENTS

| | | | | |
|---|---|---|---|---|
| 5,361,566 | A | 11/1994 | Hohnl | |
| 5,390,479 | A * | 2/1995 | Hutchison | A01B 71/06 |
| | | | | 56/15.8 |
| 6,120,401 | A | 9/2000 | Wilken | |
| 6,122,903 | A * | 9/2000 | Hayashi | A01D 34/74 |
| | | | | 56/15.8 |
| 6,494,026 | B1 | 12/2002 | Schmidt | |
| 6,952,913 | B1 * | 10/2005 | Crumly | A01D 34/76 |
| | | | | 56/11.6 |
| 7,607,283 | B2 | 10/2009 | Wright et al. | |
| 7,712,294 | B2 * | 5/2010 | Wright | A01D 34/74 |
| | | | | 56/16.3 |
| 7,779,617 | B2 | 8/2010 | Wang et al. | |
| 8,096,374 | B1 | 1/2012 | Papke et al. | |
| 8,104,552 | B2 | 1/2012 | Papke et al. | |
| 10,021,833 | B1 | 7/2018 | Nebel et al. | |
| 10,645,873 | B2 * | 5/2020 | Reichard | A01D 34/824 |
| 10,729,073 | B2 | 8/2020 | Bryant et al. | |
| 11,178,815 | B1 * | 11/2021 | Crowl | A01D 69/03 |
| 12,302,784 | B1 | 5/2025 | Crowl | F16H 7/20 |
| 2018/0125006 | A1 * | 5/2018 | Smith | B60N 2/06 |
| 2020/0346689 | A1 | 11/2020 | Moore | |

* cited by examiner

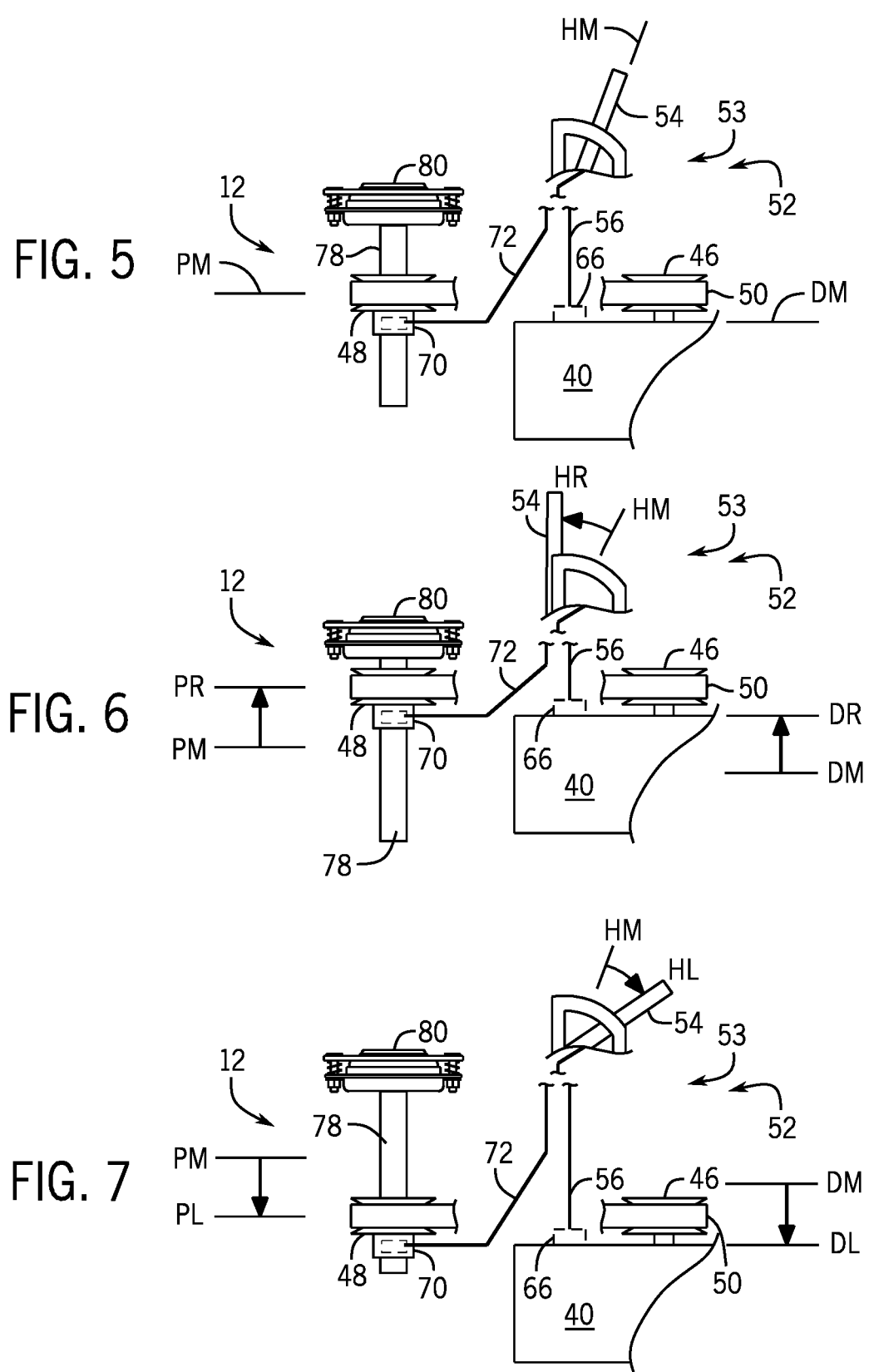

TURF MAINTENANCE MACHINE WITH DRIVE PULLEY HEIGHT ADJUSTMENT SYSTEM

CROSS-REFERENCE TO RELATED APPLICATIONS

The application claims the benefit of provisional patent application U.S. App. No. 63/322,801 filed on Mar. 23, 2022 and entitled "Turf Maintenance Machine with Drive Pulley Height Adjustment System," the entire contents of which are hereby expressly incorporated by reference into the present application.

FIELD OF THE INVENTION

The invention relates generally to turf maintenance machines and, in particular, to a method and system for pulley alignment within a belt-drive system of the machine's workpiece, such as the cutter deck of a lawnmower. Still more particularly, the invention relates to a height adjustable drive pulley that moves in a manner that reduces angle(s) of belt deflection when changing a vertical position(s) of a workpiece.

BACKGROUND OF THE INVENTION

Lawn and garden equipment is getting more efficient and versatile. Turf maintenance machines, such as stand-on and riding lawnmowers, are increasing in size and operational speed, which can reduce mowing time and therefore increase operational efficiency. Besides being more efficient, the larger and faster lawnmower are more versatile since they can be used to mow larger properties and a greater variety of property types.

Different grass types and different climatological conditions can require different optimal mowing or cutting heights. Factors that influence optimal cutting height(s) include the particular species of grasses or other foliage, lawn typography, local weather and climate, and personal preference. Mowing at an incorrect height may be aesthetically unappealing, compromise rainwater absorption characteristics and correspondingly cause drainage issues, and can damage the grasses or other foliage. Lawnmower cutting decks therefore typically are height-adjustable. In order to accommodate a wide variety of cutting height requirements, efforts have been made to provide lawnmowers with greater height adjustability of their mower decks.

However, the mower deck heigh adjustment is limited by a variety of factors, such as belt alignment issues. Typically, stand-on and riding lawnmowers utilize belt drive systems to transmit rotation of their engine output shafts to rotation of the cutting blades. A belt drive system typically includes a drive pulley that is mounted for rotation in unison with the engine output shaft or, for example, a clutched shaft that is driven by the engine output shaft. A belt connects the drive pulley to one or more driven pullies on the mower deck that rotate spindle shafts and the cutting blades that are mounted to the spindle shafts. Since the drive pulley is typically mounted at a fixed height to the engine output shaft and the driven pulleys are mounted on the height adjustable mower deck, the angle of the belt connecting the drive pulley to the driven pullies changes when the cutting height of the mower deck is adjusted by moving it vertically. True alignment or an angle of 0 degrees is ideal, but some misalignment can be tolerated. However belts operating at too great of an angle can experience premature wear both because they rub against the flanges of the pulleys and because they are crimped or bent at the driven pulleys. They also are more susceptible to slipping or rolling off from a pulley during use. Depending on factors such as belt and pulley design, angles of greater than 10-15 deg. are generally disfavored. Limiting to belt misalignment angles to within a tolerated range has proven to be a limiting factor on the available range of mower cutter deck height adjustment, Different strategies have been implemented to try addressing these belt alignment issues. One attempt includes mounting the engine to the mower deck so that the belt drive system moves as a unit to maintain consistent belt alignment. However, this adds substantial weight to the mower deck assembly, which must be suspended from the chassis and raised and lowered by an operator while adjusting the deck height. Furthermore, engines mounted to mower decks are subjected to at least some of the same forces as the mower decks, including vibrations and shock-loads during collisions with objects during use.

Accordingly, a need exists to allow for a large range of deck height adjustability while minimizing belt misalignment of a drive belt system.

A need also exists to provide a height adjustable pulley of a drive belt system that is isolated from the mower deck's operational forces.

SUMMARY OF THE INVENTION

In accordance with a first aspect of the invention, these needs are met by providing a drive pulley height adjustment system for a turf maintenance machine that vertically repositions a drive pulley in coordination with height adjustments of the machine's workpiece, thus permitting a wider range of workpiece positional adjustment. The turf maintenance machine may be a lawnmower, and the workpiece may be a cutter deck.

In accordance with another aspect of the invention, a lawnmower implements a drive pulley height adjustment system that automatically changes a height of a drive pulley as a function of height adjustments of a cutter deck. The drive pulley height adjustment system may support the drive pulley from a chassis frame while facilitating vertical movement of the drive pulley. The drive pulley is supported independent of the moveable support arrangement of the cutter deck from the chassis frame.

In accordance with another aspect of the invention, a single actuator, such as a handle, may be manipulated to simultaneously move the independently mounted drive pulley and cutter deck.

Also provided is a method of adjusting the position of a drive pulley of a turf maintenance machine in order to accommodate positional adjustment of the machine's workpiece.

In accordance with yet another aspect of the invention, a drive system is provided for a workpiece of a turf maintenance machine having a frame supporting a motive power source, typically an engine. The drive system includes a drive pulley that is configured to be rotatably coupled to the motive power source so as to be positionally adjustable relative to the frame. A workpiece configured to supported on the frame so as to positionally adjustable relative to the frame in the same direction as the drive pulley, the workpiece having a rotatable tool, and a driven pulley is supported on the workpiece and is configured to drive the rotatable tool to rotate. An endless belt couples the driven pulley to the drive pulley, and a drive pulley height adjustment system is configured to move the drive pulley relative to the frame in order to accommodate positional adjustment of the workpiece.

The turf maintenance machine may be a lawnmower, in which case the workpiece may be a vertically adjustable cutter deck, and the rotatable tool may comprise a blade.

These and other aspects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof.

BRIEF DESCRIPTION OF THE DRAWINGS

An exemplary embodiment of the invention is illustrated in the accompanying drawings in which like reference numerals represent like parts throughout, and in which:

FIG. 5 is a side elevation view of components of the pulley height and deck height adjustment systems in a neutral position;

FIG. 6 is a side elevation view of components of the pulley height and deck height adjustment systems in a raised position;

FIG. 7 is a side elevation view of components of the pulley height and deck height adjustment systems in a lowered position.

DETAILED DESCRIPTION

Figure 1:
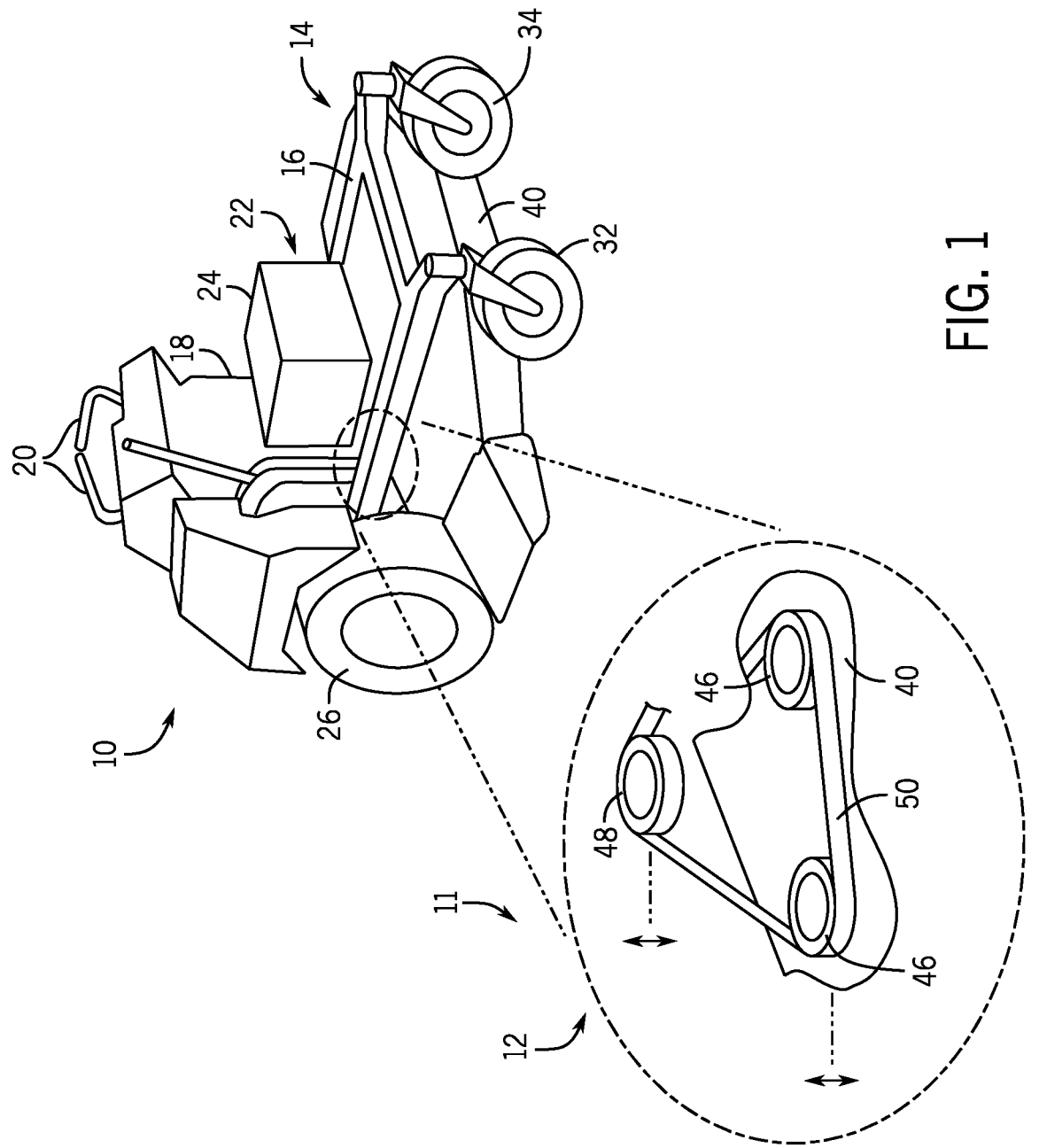
FIG. 1 is a partially schematic view of a turf maintenance machine implementing a pulley height adjustment system as a belt alignment system in accordance with an aspect of the invention.

Referring now to the drawings and initially to FIG. 1, in accordance with an aspect of the invention, a turf maintenance machine is shown with a belt alignment system that may be implemented as a drive pulley adjustment system that provides for axial positional adjustment of a drive pulley to accommodate positional adjustment of the machine's workpiece. The positional adjustment typically will occur in the same coordinate direction as the adjustment of the workpiece-most typically vertically. In the illustrated embodiment, the turf maintenance machine takes the form of a lawnmower 10 with a belt alignment system 11 implemented as a pulley adjustment system, specifically shown here as drive pulley height adjustment system 12. Although the turf maintenance machine is shown as a stand-on zero-turn lawnmower, the drive pulley height adjustment system 12, or other systems falling within the spirit and scope of the present invention, may be implemented on other exemplary machines or pieces of equipment, including those with seated or riding configurations as well as non-seated types such as stand-on and walk-behind configurations, having positionally adjustable belt-driven elements. Examples include various turf maintenance machines with positionally adjustable belt-driven elements, such as mowers, aerators, edgers, and others.

Still referring to FIG. 1, lawnmower 10 includes a chassis 14 with a frame 16 from which an upright handlebar support(s) 18 extends. Steering control levers 20 are mounted to the handlebar support(s) 18 and may be moveable forward and back, such as between references bars (not shown), to provide the steering/propel input to the lawnmower 10 from the operator during use. Manipulating the steering control levers 20 controls a drive-system 22 that is powered by a prime mover as a motive power source, such as engine 24, although it is understood that other prime movers, such as electric motors, may be implemented. Drive-system 22 typically includes a pair of variable flow hydraulic pumps (not shown), which may be axial-piston-type pumps with internal tilting swash plates and provide hydraulic pressure to drive a pair of hydraulic wheel motors (not shown) that connect to and drive an associated drive wheel, only one of which is shown as wheel 26 toward the back of lawnmower 10. Toward the front of lawnmower 10, undriven casters 32, 34 are pivotally attached to a front portion of the frame 16.

Between the drive wheels 26 and casters 32, 34, mower or cutter deck 40 is suspended from the frame 16 by a deck support system 66. Cutter deck 40 includes an upper surface 41, a peripheral wall 43 extending downwardly from the upper surface, and a discharge chute 45 which, in the illustrated example, extends from a side of the cutter deck 40. Cutter deck 40 is typically a multi-blade deck with two or more blades 42 (FIG. 2) located within the cutter deck. Each blade 42 is supported on a spindle 44 (FIG. 2) extending vertically through the upper surface 41 of the cutter deck. The upper ends of the spindles 44 are connected to and rotated by driven pulleys 46 that receive power from a drive pulley 48 by way of a belt 50 that is routed through and connects the driven and drive pulleys 46, 48.

Figure 2:
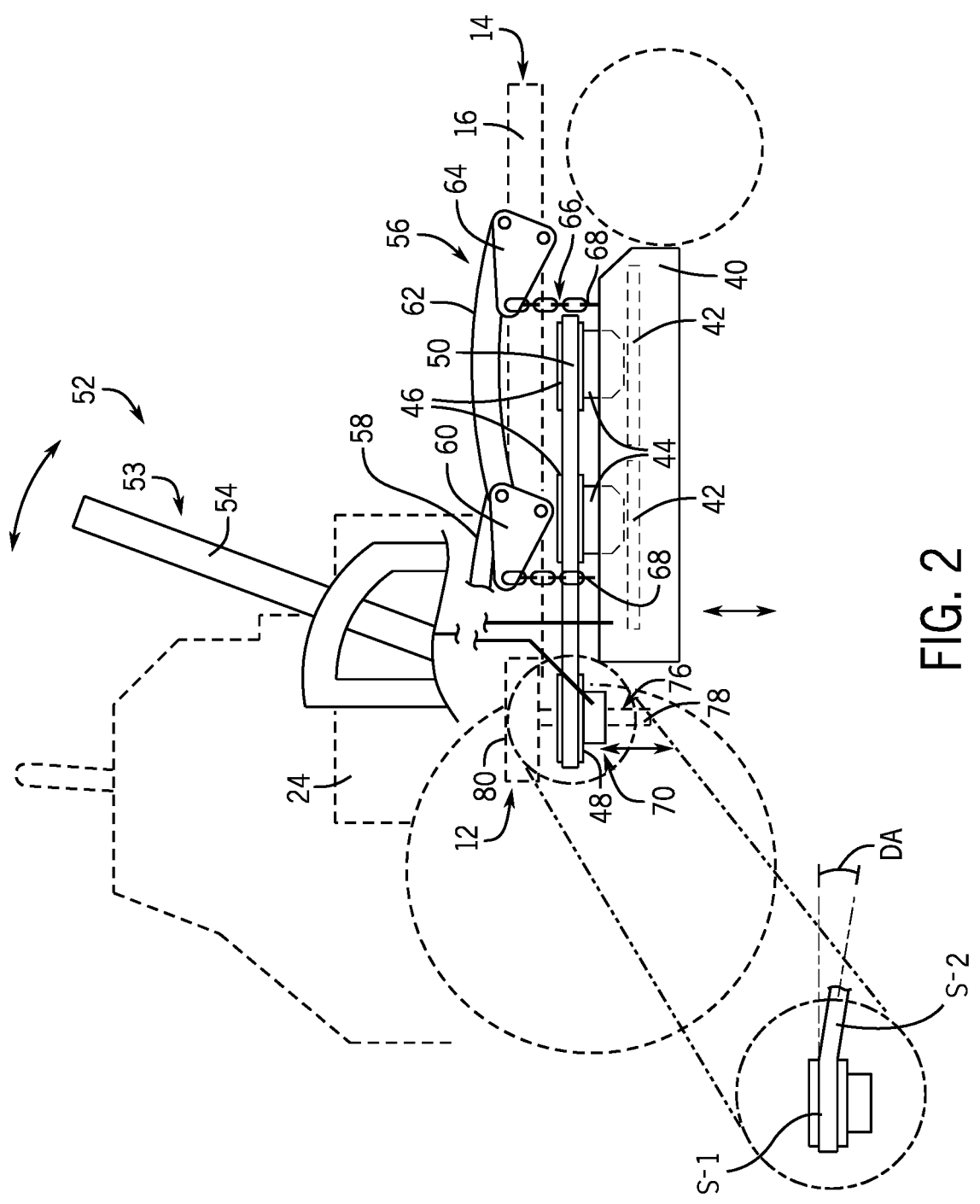
FIG. 2 is a partially schematic side elevation view of the turf maintenance machine of FIG. 1.

Referring now to FIG. 2, deck height adjustment system 52 is adjustable to vertically move the cutter deck 40 to adjust the cutting height. Deck height adjustment system 52 includes an actuator 53 that may be implemented as a manual actuator or a powered actuator. Deck height adjustment system 52 is shown here with a manual actuator 53 that is implemented as a handle 54 that can pivot to actuate a deck linkage system 56 that translates the pivot movement of handle 54 into vertical movement of cutter deck 40. It is understood that the deck height adjustment system 52 may include other components that can be actuated to provide movement of cutter deck 40, such as a pedal (not shown) that can be actuated by an operator to control deck height. Rear deck lift link 58 connects a lower end of handle 54 to a lobe on a bell-crank-type weldment or rear cam 60. Rear cam 60 pivots to translate the generally horizontal pushing and pulling of rear deck lift link 58 into generally horizontal pushing and pulling of front deck lift link 62 that pivots another bell-crank-type weldment or front cam 64. Deck support system 66 typically includes chains 68 that connect the rear and front cams 60, 64 to rear and front segments of cutter deck 40. Four chains 68 typically are provided, one at or in the vicinity of each corner of the cutter deck. The generally horizontal pushing and pulling of rear and front deck lift links 58, 62 is converted through pivoting of the rear and front cams 60, 64 into vertical movement of the chains 68, which raise or lower the cutter deck 40 relative to the frame 16.

Still referring to FIG. 2, during use of the deck height adjustment system 52 to adjust the height of cutter deck 40, the belt 50 raises and lowers with vertical movement of cutter deck 40 and pulleys 46. Without the pulley-height adjustment system 12, vertical movement and of the cutter deck 40 and driven pulleys 46 relative to the frame 16 would change the vertical spacing between the drive pulley 48 and the driven pulleys 46. This change in spacing would change the angle at which the belt 50 engages the pulleys 46 and 48. It also changes the inclination of different belt sections with respect to each other. Vertical movement of the drive pulley 48 in a coordinated manner with the cutter deck 40 and pulleys 46, however, reduces or even eliminates that change in inclination during deck height adjustment. This attenuates a belt deflection angle "DA" or reduces any changes in the belt deflection angle DA during the deck height adjustment procedure(s). Referring to the enlarged area of FIG. 2, belt deflection angle DA is defined by an angle at which the belt 50 bends from its pulley-engaged segment to its segment that extends between adjacent pulleys, or an intersection of a plane that extends radially through the pulley and a plane in which the belt segment is arranged in its extension between adjacent pulleys. Stated another way, if the belt is considered a two-dimensional object having a first section S1 engaging the pulley and extending in a radial plane of the pulley and a second section S2 extending away from the pulley, the belt deflection angle DA can be thought of the angle of inclination of the second section S2 relative to the radial plane. In the case in which the shaft extends vertically and the radial plane of the pulley is a horizontal plane, the deflection angle DA is an angle of inclination of the second section S2 of the belt relative to the horizontal. Adjacent pulleys with greater axial offsets upon their respective shafts provide larger belt deflection angles DA and adjacent pulleys with less axial offsets provide smaller belt deflection angles DA. Pulleys that are radially aligned with each other define no axial offset and typically provide a belt deflection angle DA of about 0-degrees, with any deflection being nominal and primarily due to the weight of the belt causing a corresponding nominal droop between adjacent pulleys.

Figure 3:
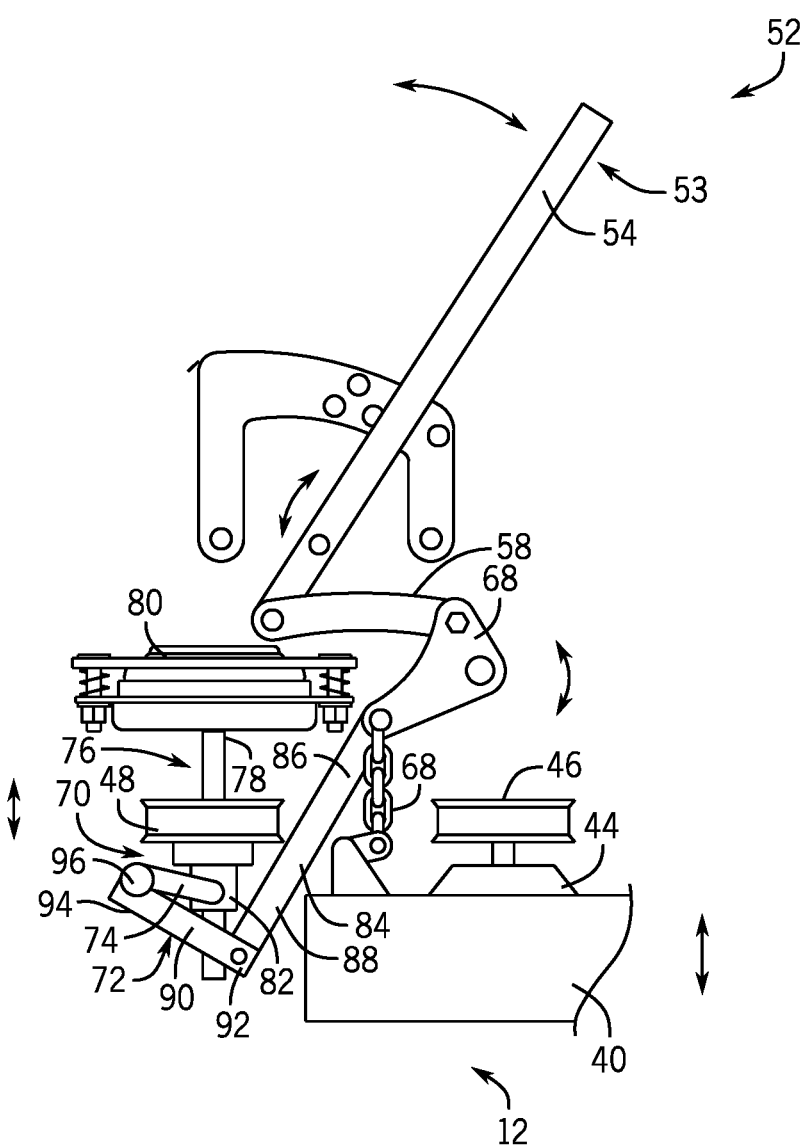
FIG. 3 is a side elevation view of portions of the pulley height and deck height adjustment systems of FIG. 1.

Referring now to FIG. 3, drive pulley height adjustment system 12 includes a drive pulley support system 70 that is supported by frame 16, independent of the cutter deck's 40 support from frame 16 by the deck support system 66. This provides isolation of the drive pulley 48 from forces experienced by cutter deck 40, such as impact forces associated with collisions of the cutter deck 40 with the ground or if the cutter deck 40 bounces when the mower rides over a bump.

Still referring to FIG. 3, drive pulley linkage system 72 controls the movement of the drive pulley 48 to synchronize its vertical movement with vertical movement associated with height adjustment of cutter deck 40. Drive pulley support system 70 includes collar 74 that is connected to drive pulley 48 and that locks the drive pulley 48 into rotation unison with a powered shaft 76 that transmits power from engine 24 (FIG. 2) for rotating belt 50 (FIG. 2). Powered shaft 76 may be an output shaft of engine 24 output shaft or a separate downstream shaft that transmits power from the engine's 24 output shaft. Powered shaft 76 is shown here as a PTO output shaft 78 that selectively rotates and delivers power out of clutch 80 when the clutch 80 is engaged. Clutch 80 is shown here as an electromagnetic clutch with an input end that is connected to the engine's 24 output shaft (not shown) and, when energized, engages to lock the clutch's input end to its output end and correspondingly rotates the PTO output shaft 78.

Still referring to FIG. 3, clutch 80 and its PTO output shaft 78 are mounted at a fixed height relative to the chassis frame 16 (FIG. 2). Height adjustment of drive pulley 48 is typically achieved by the drive pulley linkage system 72 interacting with drive pulley support system 70 to slide drive pulley 48 vertically along the length of PTO output shaft 78 while the drive pulley 48 and PTO output shaft 78 remain in rotational unison with each other. Typically, providing height adjustability and maintaining rotational engagement is accomplished with cooperating drive and driven features that permit axial movement of the drive pulley 48, such as a splined coupling arrangement, a keyway arrangement, or other arrangements that allow the drive pulley 48 to move relative to its driving shaft or other driving component. Sleeve 82 has a non-rotating cylindrical body through which PTO output shaft 78 extends. Although PTO output shaft 78 is shown here as a splined shaft, it is understood that the shaft which drives the drive pulley 48 may have a different configuration, such as a double-D shaft, a star shaft, or others. An upper end of sleeve 82 is connected to, for example, a fixed race of a bearing set that supports the collar 74 so that the non-rotating sleeve 82 supports the rotating collar 74 and drive pulley 48. This allows the drive pulley linkage system 72 to lift and lower the sleeve 82 and correspondingly also lift and lower the collar 74 and drive pulley 48 relative to the shaft 78. Drive pulley linkage system 72 is shown here with a forward pulley link 84 that has an upper end 86 attached to rear cam 60 and a lower end 88 attached to rear pulley link 90 at its forward end 92. The rear pulley link's rear end 94 is attached to a pivoting shaft 96 pivots a fork 100 that is connected to and moves sleeve 82.

Figure 4:
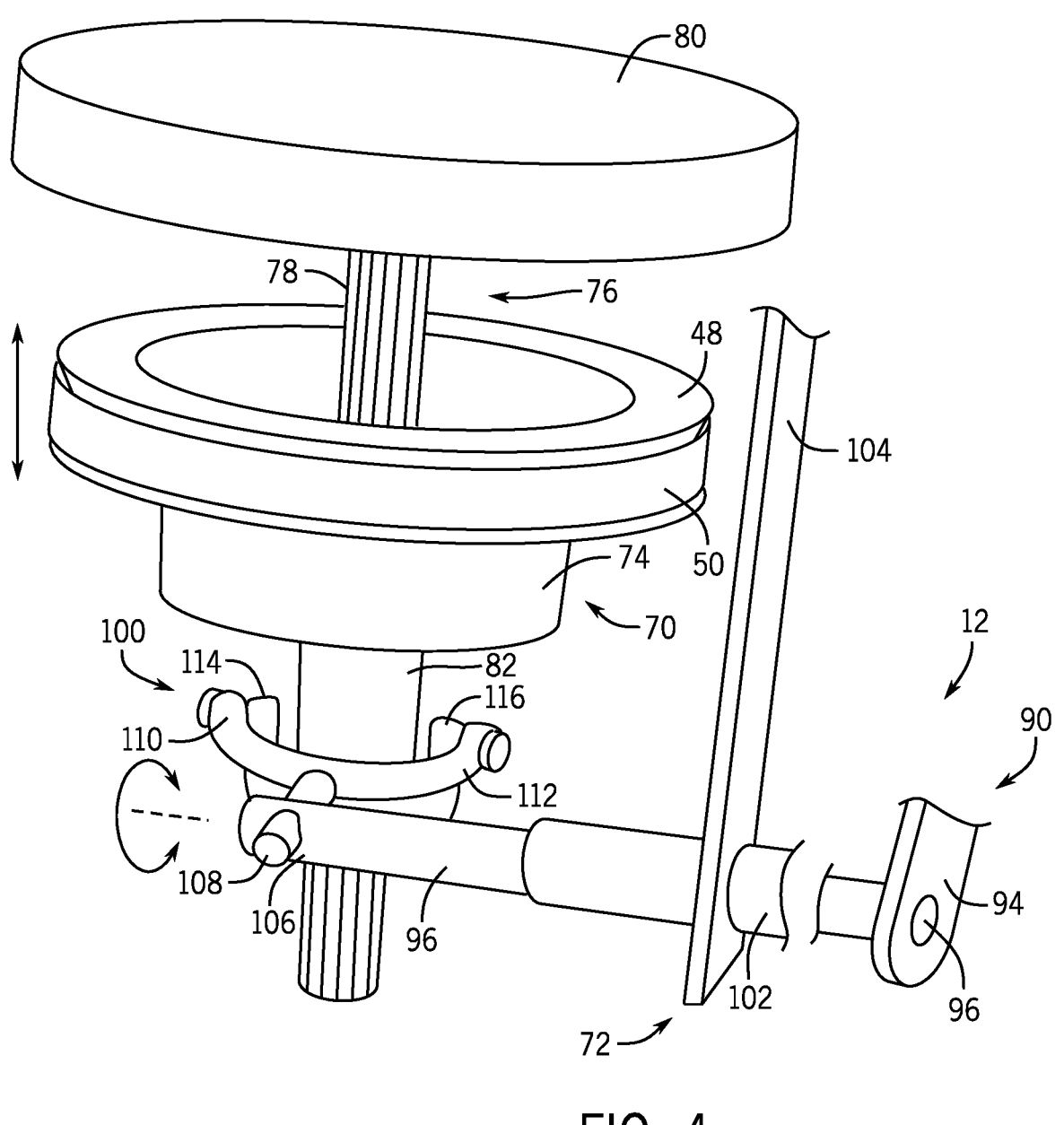
FIG. 4 is an isometric view of portions of the pulley height adjustment system of FIG. 1.

Referring now to FIG. 4, shaft support 102 is a hollow tube that is mounted in a fixed position to the chassis frame 16 (FIG. 2) through brace 104. Shaft 96 is concentrically housed for rotation in and extends from an end of shaft support 102. Outer end 104 of shaft 96 is mounted to the rear pulley link's rear end 94 (FIG. 3) so that pivoting of the rear pulley link 90 correspondingly rotates shaft 96 about its longitudinal axis. Inner end 106 of shaft 96 is connected to a finger 108 that extend from a main body of fork 100. First and second side prongs 110, 112 of fork 100 are connected to mounting bosses 114, 116 of the sleeve 82. The fork 100 could be replaced by a pair of parallel links on opposite sides of the shaft 78 or any other coupling arrangement that translates rotational movement of the shaft 96 to vertical movement of the drive pulley 48 along the shaft 96.

Referring now to FIGS. 5-7, coordinated height adjustment of the drive pulley 48 and cutter deck 40 is shown during cutter deck height adjustment procedures. Although drive pulley 48 is supported independent of cutter deck 40, vertical movements of the drive pulley 48 and cutter deck 40 are coordinated and synchronized for simultaneous movement along first and second separate paths of actuation through movement of a single input device of the handle 54. In FIG. 5, deck height adjustment system 52 is shown in a neutral state or intermediate position(s). Handle 54 in an intermediate or handle mid-position HM. When handle 54 is at the mid-position HM, both the cutter deck 40 and the drive pulley 48 are in intermediate positions, respectively shown as cutter deck mid-position DM and drive pulley mid-position PM. In FIG. 6, deck height adjustment system 52 has been manipulated to provide a raised state or raised position(s). Handle 54 is pulled rearward from the handle mid-position HM to a handle raised position HR. This repositioning of handle 54 actuates both the deck linkage system 56 and the drive pulley linkage system 72 to provided coordinated and synchronized movement of the deck 40 and drive pulley 48. In a comparison of the raised position(s) to the intermediate position(s), cutter deck 40 had been moved vertically upward from cutter deck mid-position DM to a cutter deck raised position DR and drive pulley 48 has been moved vertically upward along shaft 78 from drive pulley mid-position PM to a drive pulley raised position PR. In FIG. 7, deck height adjustment system 52 has been manipulated to provide a lowered state or lowered position(s). Handle 54 is pushed forward from the handle mid-position HM to a handle lowered position HL. In a comparison of the lowered position(s) to the intermediate position(s), cutter deck 40 had been moved vertically downward from cutter deck mid-position DM to a cutter deck lowered position DL and drive pulley 48 has been moved vertically downward along shaft 78 from drive pulley mid-position PM to a drive pulley lowered position PL.

Still referring generally to FIGS. 5-7, cutter deck 40 may have a height adjustability of at least 4 inches, defined between its lowest and highest height positions, or at least 7-inches of deck height adjustability, or even of up to 10-inches of deck height adjustability. The drive pulley height adjustment system 12 allows the height adjustability of drive pulley 48 to at least generally correspond to the height adjustability of deck 40, maintaining the belt's deflection or orientation angle as a value within a target belt deflection range. During the coordinated and synchronized movement of drive pulley 48 and cutter deck 40, the amount of height adjustment may be substantially the same, with vertical travel distances during adjustment(s) of the drive pulley 48 and cutter deck 40. While adjusting the height of cutter deck 40, the vertical distances that the cutter deck 40 and drive pulley 48 move are typically within 25-percent of each other, more typically within 15-percent of each other, and most typically within 10-percent of each other. Regardless of a particular amount of height adjustment differential between the drive pulley 48 and cutter deck 40, any difference maintains the belt deflection angle value within the targe belt deflection range, typically providing a belt deflection or orientation angle of no more than 15-degrees, more typically less than 10-degrees, such as less than 5-degrees. Most typically, the maximum angle of belt deflection or orientation angle is 7-degrees.

Figure 8:
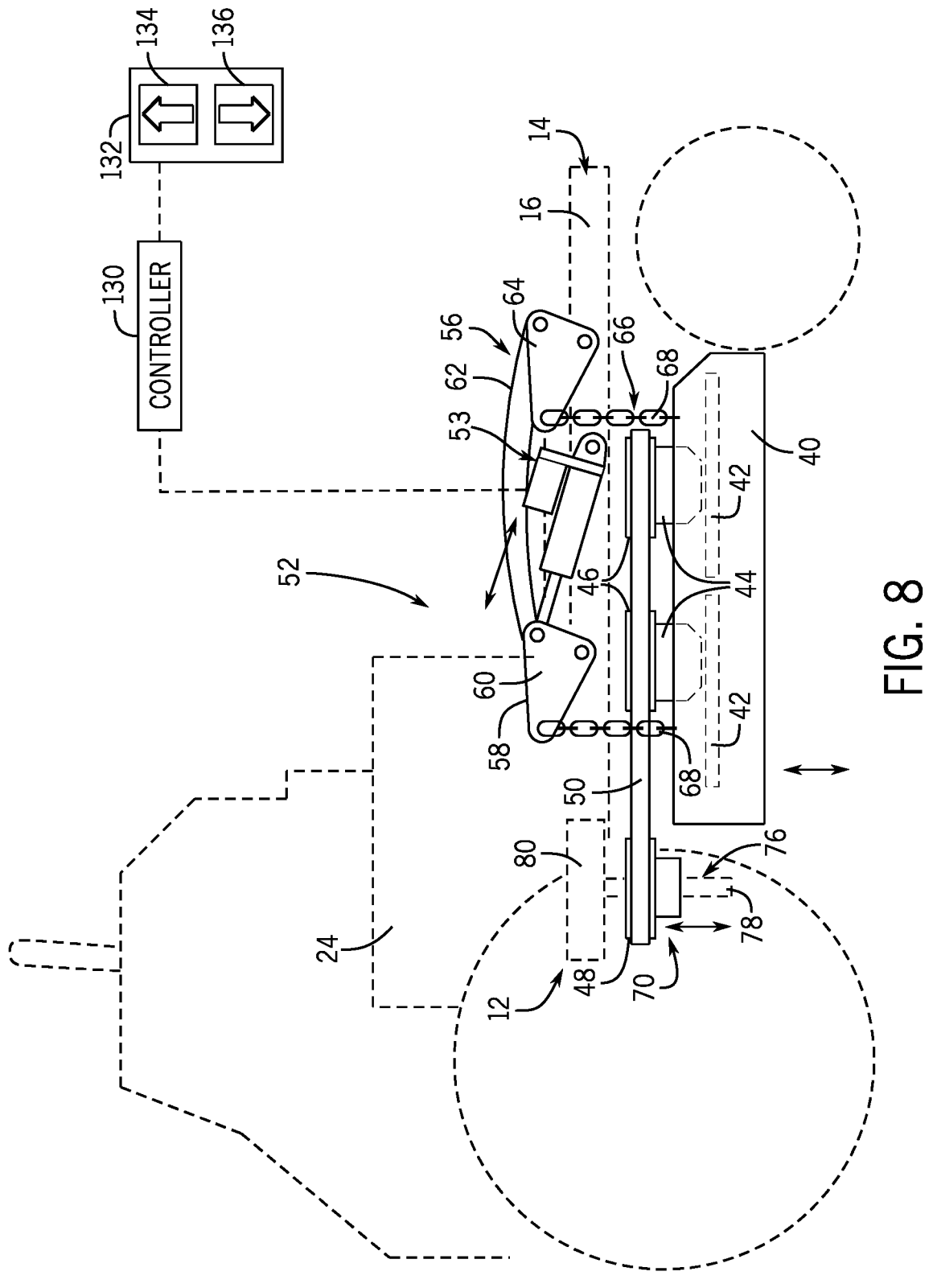
FIG. 8 a partially schematic side elevation view of the turf maintenance machine of FIG. 1 with a variant of the actuator.

Referring now to FIG. 8, deck height adjustment system 52 includes a powered actuator 53 instead of the manual-type handle 54 of FIG. 2. Powered actuator 53 may be, for example, a pneumatic or even hydraulic actuator or, as shown here, an electric actuator. Powered actuator 53 has a fixed end or barrel that is connected to the chassis' frame 16 and a moveable end or rod that is connected to a lobe of the rear cam 60. Selective extension and retraction of the rod translates into vertical movement of the cutter deck 40, driven pulley(s) 46, and drive pulley 48 in the same way as described above through the bell-crank-type weldment(s) of the cams 60, 64, and deck lift link 62 with respect to the manual-type actuator of handle 64, only without requiring the operator to provide the actuating force. Accordingly, the component and movement descriptions above with respect to FIGS. 2-7 are applicable here with respect to the powered actuator 53 of FIG. 8. Although the actuator 53 is shown connected to rear cam 60, it may instead be connected to front cam 64 or another component or feature of the linkage that provides the bell-crank type structure that converts force application into lifting/lowering movements of cutter deck 40.

Still referring to FIG. 8, it is further understood that the powered actuator 53 is controlled by way of a control system 130 that is implemented as a system of control circuits with corresponding relays, switches, sensors, and/or other machine control components. In some implementations, the control system may include a PLC (programmable logic controller), or a microcontroller or other computer that executes various stored programs while receiving inputs from and sending commands to the subsystems of or components of the electronic systems, depending on the particular type of powered actuator 53. A corresponding control input device(s) 132 such as lift and lower buttons 134, 136 provide an interface through which the user issues lift/lower commands that are executed by the control system to control actuation of the actuator 53.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

As indicated above, many changes and modifications may be made to the present invention without departing from the spirit thereof. The scope of some of these changes is discussed above. The scope of others is apparent from the appended claims.

What is claimed is:

1. A turf maintenance machine comprising:
   a chassis that includes a frame that supports a motive power source;
   a workpiece that includes a rotatable tool and that is configured to be supported by the frame so as to be positionally adjustable with respect to the frame during an adjustment procedure;
   a first pulley that is supported by the workpiece so as to be movable in unison with the workpiece during the adjustment procedure and that is configured to transmit power to the rotatable tool;
   a second pulley that is supported on the turf maintenance machine independently of the workpiece;
   a belt that transmits power from the second pulley to the first pulley and that defines a belt deflection angle value as an angle of the belt with respect to at least one of the first and second pulleys; and
   a belt alignment system that is configured to coordinate movement of the second pulley to the movement of the first pulley during the adjustment procedure so as to maintain the belt deflection angle value within a target belt deflection range and permit movement of the workpiece independently of the second pulley.

2. The turf maintenance machine of claim 1, wherein:
   the turf maintenance machine is a lawnmower:
   the motive power source is an engine mounted to the frame, the engine including an engine output shaft that is configured to rotate to transmit power out of the engine;
   the workpiece is a cutter deck supported at a variable height from the frame,
      and the rotatable tool includes at least one blade rotatable to cut grasses or other foliage;
   the second pulley is a drive pulley that transmits power from the engine to the cutter deck for rotating the at least one blade;
   the belt alignment system includes a drive pulley height adjustment system that is configured to move the drive pulley vertically relative to the frame in order to accommodate cutter deck height adjustment.

3. The turf maintenance machine of claim 2, wherein:
   a powered shaft is rotated by the engine; and
   the drive pulley is mounted on the powered shaft at a variable height with the drive pulley height adjustment system being configured to move the drive pulley along the powered shaft to coordinate a vertical movement of the drive pulley with a vertical movement of the cutter deck during a cutter deck height adjustment procedure.

4. The turf maintenance machine of claim 3, wherein:

a deck support system connects the cutter deck to the frame and is movable to adjust the height of the cutter deck relative to the frame; and the drive pulley height adjustment system includes a drive pulley support system that is movable vertically along the powered shaft to adjust a height of the drive pulley; and an actuator that is movable with respect to the frame to actuate each of the deck support system and the drive pulley support system to adjust the heights of each of the cutter deck and the drive pulley.

5. The turf maintenance machine of claim 4, further comprising:

a cam that is attached to each of the deck support system and the drive pulley support system, with movement of the actuator correspondingly moving the cam to simultaneously adjust the heights of the cutter deck and the drive pulley.

6. The turf maintenance machine of claim 4, further comprising:

a deck linkage system that is configured to translate movement of the actuator to movement of the deck support system; and a drive pulley linkage system that is configured to translate movement of the actuator to movement of the drive pulley support system.

7. The turf maintenance machine of claim 3, wherein the powered shaft is a splined shaft, and wherein a splined coupling arrangement locks the drive pulley into rotational unison with the splined shaft.

8. The turf maintenance machine of claim 7, wherein the splined coupling arrangement is configured to allow the drive pulley to move vertically along a longitudinal axis of the splined shaft.

9. The turf maintenance machine of claim 8, further comprising:

an actuator that is movable with respect to the frame for adjusting the heights of each of the cutter deck and the drive pulley;

a deck linkage system that is configured to translate movement of the actuator to movement of the cutter deck along a first path of actuation; and a drive pulley linkage system that is configured to translate movement of the actuator to movement of the drive pulley along a second path of actuation.

10. The turf maintenance machine of claim 9, wherein the actuator comprises a handle that defines a manual actuator.

11. The turf maintenance machine of claim 9, wherein the actuator comprises a powered actuator, the powered actuator comprising one of an electric actuator and a powered cylinder.

12. The lawnmower of claim 9, wherein the drive pulley linkage system comprises:

a fork that is configured to pivot between a first lowered position that defines a drive pulley lowered position and a second raised position that defines a drive pulley raised position.

13. A method of maintaining pulley alignment while adjusting the height of a workpiece of a turf maintenance machine, the workpiece being driven by a driven pulley that connected to a drive pulley by a belt, the method comprising:

manipulating an actuator during turf maintenance workpiece positional adjustment procedure;

translating motion of the actuator along a first actuation path to move the workpiece and the driven pulley relative to a frame of the turf maintenance machine in a direction;

translating motion of the actuator along a second actuation path to independently move the drive pulley relative to the frame in the same direction as a workpiece movement; and permitting movement of the workpiece independently of the drive pulley.

14. The method of claim 13, wherein the turf maintenance machine is a lawnmower, the workpiece is lawnmower cutter deck, and the cutter deck and drive pulley move vertically during positional adjustment.

15. A drive system for a workpiece of a turf maintenance machine having a frame supporting a motive power source, the drive system comprising:

a drive pulley that is configured to be rotatably coupled to the motive power source so as to be positionally adjustable relative to the frame;

a workpiece that is configured to be supported on the frame for movement independently of the drive pulley so as to positionally adjustable relative to the frame in the same direction as the drive pulley, the workpiece having a rotatable tool;

a driven pulley that is supported on the workpiece and that is configured to drive the rotatable tool to rotate;

an endless belt that couples the driven pulley to the drive pulley; and a drive pulley height adjustment system that is configured to move the drive pulley relative to the frame in order to accommodate positional adjustment of the workpiece and permit movement of the workpiece independently of the drive pulley.

16. The drive system of claim 15, wherein the turf maintenance machine is a lawnmower, the workpiece is a vertically adjustable cutter deck, and the rotatable tool comprises a blade.

17. The drive system of claim 16, wherein the lawnmower has a deck support system that connects the cutter deck to the frame and that is movable to adjust the height of the cutter deck relative to the frame, and wherein the drive pulley height adjustment system includes a drive pulley support system that is movable along a powered shaft to adjust a height of the drive pulley, and an actuator that is movable with respect to the frame to adjust the heights of each of the cutter deck and the drive pulley.

* * * * *